US012777173B2

(12) United States Patent
Fujieda et al.

(10) Patent No.: US 12,777,173 B2
(45) Date of Patent: Oct. 27, 2026

(54) NEURAL TEXTURE BLOCK COMPRESSION

(71) Applicant: Advanced Micro Devices, Inc., Santa Clara, CA (US)

(72) Inventors: Shin Fujieda, Tokyo (JP); Takahiro Harada, Roseville, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 19/087,784

(22) Filed: Mar. 24, 2025

(65) Prior Publication Data

US 2026/0292217 A1 Sep. 24, 2026

(51) Int. Cl.

| | |
|---|---|
| ***H04N 19/186*** | (2014.01) |
| ***G06T 7/90*** | (2017.01) |
| ***G06V 10/56*** | (2022.01) |
| ***G06V 10/82*** | (2022.01) |
| ***H04N 19/176*** | (2014.01) |

(52) U.S. Cl.

CPC ............. *H04N 19/186* (2014.11); *G06T 7/90* (2017.01); *G06V 10/56* (2022.01); *G06V 10/82* (2022.01); *H04N 19/176* (2014.11); *G06T 2207/10024* (2013.01)

(58) Field of Classification Search

CPC .... G06T 1/20; G06T 7/40; G06T 9/00; G06T 9/002; G06T 7/90; G06T 2207/10024; G06F 3/0608; G06F 3/0661; G06F 3/067; G06F 3/0671; H03M 7/30; H03M 7/3059; H03M 7/6052; H04N 19/186; H04N 19/176; G06V 10/56; G06V 10/82

USPC ............................................. 375/240–240.29

See application file for complete search history.

(56) References Cited

U.S. PATENT DOCUMENTS

| | | | | |
|---|---|---|---|---|
| 9,378,569 | B2 | 6/2016 | Yamane | |
| 2016/0140688 | A1* | 5/2016 | Lee | G06T 9/00 345/426 |
| 2017/0032543 | A1* | 2/2017 | Cho | G06T 11/10 |
| 2018/0130263 | A1* | 5/2018 | Kwon | G06T 9/00 |
| 2019/0304138 | A1* | 10/2019 | Fuller | G06T 9/002 |
| 2019/0304140 | A1* | 10/2019 | Fuller | G06F 12/023 |

OTHER PUBLICATIONS

Weinreich, C. & L. De Oliveira, et al., "Real-Time Neural Materials using Block-Compressed Features", Ubisoft La Forge, submitted to Computer Graphics Forum (Feb. 2024) arXiv:2311.16121v2 [cs. CV] Feb. 18, 2024, 13 pp.

* cited by examiner

*Primary Examiner* — Nathnael Aynalem

(74) *Attorney, Agent, or Firm* — Kowert, Hood, Munyon, Rankin & Goetzel, P.C.; Rory D. Rankin

(57) ABSTRACT

Systems and methods for Neural Texture Block Compression (NTBC) of graphics textures using neural networks are disclosed. NTBC employs multi-layer perceptron (MLP) networks to map uncompressed textures to block-compressed formats, such as BC1 and BC4, achieving storage reductions while maintaining reasonable visual quality. The methods and systems use MLPs to compress textures in BC1 and BC4 formats. A first neural network comprises an endpoint network that predicts endpoints for each data point of a block of a texture. The second neural network is a color network which predicts original colors of uncompressed textures. To encode the inputs to these neural networks, multi-resolution feature grids are used that allows for usage of small MLPs and encourages model optimization.

20 Claims, 6 Drawing Sheets

NEURAL TEXTURE BLOCK COMPRESSION

BACKGROUND

Description of the Related Art

The demand for high visual fidelity in real-time graphics applications is ever-increasing with the desire for more immersive experiences in games and virtual reality. To achieve high visual fidelity, textures play a crucial role in providing detailed and realistic surfaces through material properties such as diffuse color, normal maps, and other information. However, each material property requires a high-resolution texture which consumes a large portion of storage and memory bandwidth on GPUs and is often the bottleneck for the performance of graphics applications. Texture compression techniques are widely used to reduce textures' storage size and memory bandwidth requirements. Popular texture compression formats on GPUs include the block based compression formats (BC1-BC7), which are supported by many modern GPUs and graphics APIs such as DirectX.

These formats offer random-access property, which is desirable to be used on GPUs, where each 4×4 block of data points is compressed to a fixed number of bytes. In one example, BC1 and BC4 compress each block to 8 bytes, while other formats compress each block to 16 bytes. Therefore, a single 4k texture compressed even with BC1 and BC4 requires 8 MB of storage, which reaches the magnitude of gigabytes for a scene with hundreds of 4k textures that are common in modern high-quality games.

Recent formats in block compression such as BC6H and BC7 achieve higher-quality compression with a variety of modes and spatial partitioning patterns for each block. More recently, variable-rate compression formats also offer a well-balanced compression between quality and storage, using variable block sizes and flexible bit rates. However, these formats require more expensive computations to find optimal configurations for each block.

In view of the above, improved systems and methods for instructions scheduling in computer architectures are needed.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
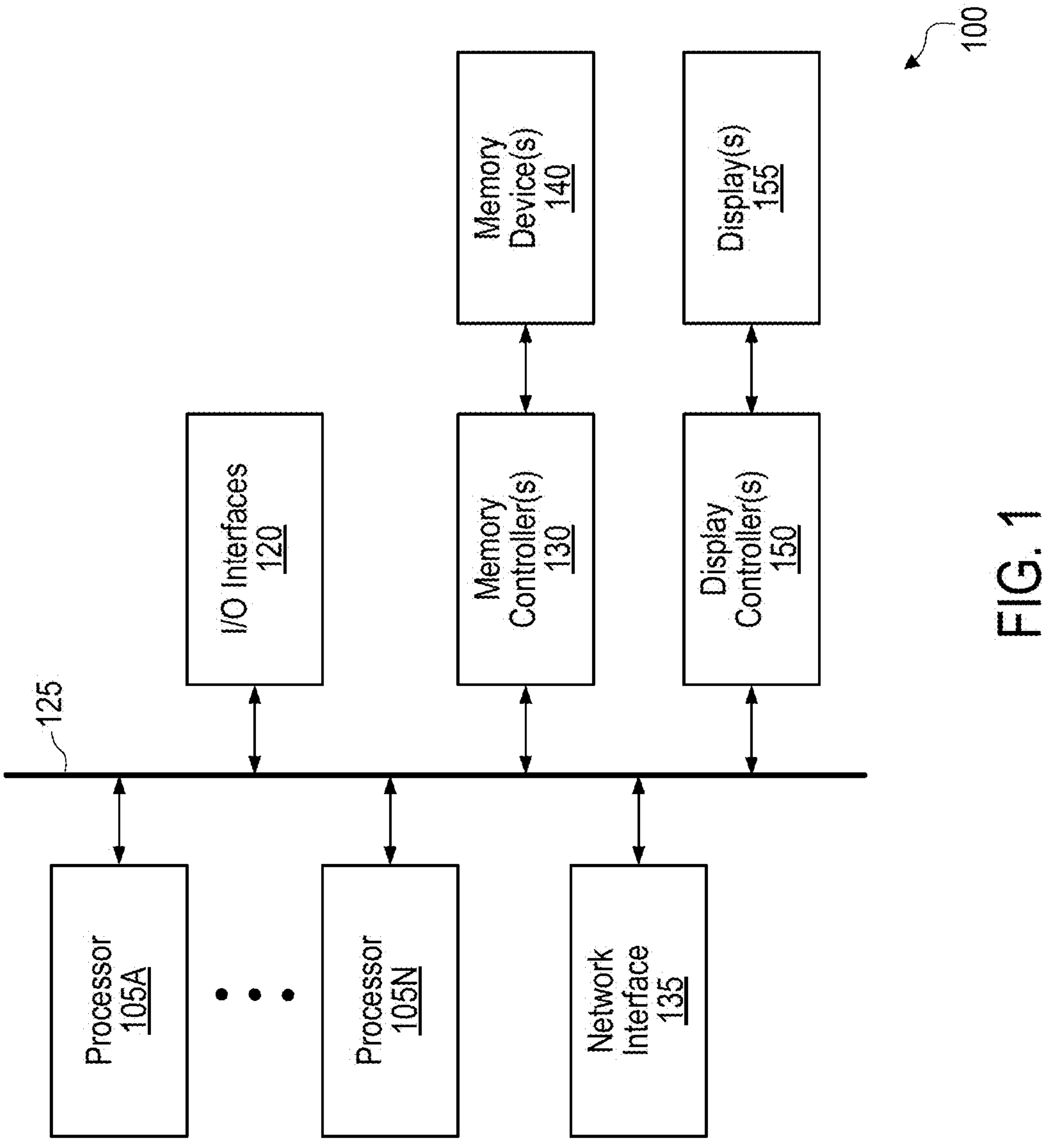
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

The systems and methods described herein introduce generating compressed blocks of data using neural network compression techniques. In implementations described herein, uncompressed texture data is compressed using block compression techniques. However, the methods and mechanisms disclosed herein may also be applied to other types of data and compression techniques. The systems and methods describe multi-layer perceptron (MLP) networks to map uncompressed textures directly into block-compressed formats, such as BC1 and BC4, achieving significant storage reductions while maintaining reasonable visual quality. The proposed methods and systems use two MLPs to compress textures in BC1 and BC4 formats. A first neural network comprises an endpoint network that predicts endpoints for each 4×4 texel (texture element) block. As used herein, "texel" refers to a "texture element" which is the smallest unit of a texture map. The second neural network is a color network which infers or predicts original colors of uncompressed textures. To encode the inputs to these neural networks, multi-resolution feature grids are used that allows for usage of small MLPs and encourages model optimization. The described neural networks are optimized specifically for one material having multiple textures, such that the models can encode and decode multiple textures in a material at once, differentiating them from conventional block compression processes. Additionally, two different approaches to compressing RGB and single-channel textures separately and together are described. In an "aggressive" approach, a single neural network model compresses RGB textures in BC1 format and single-channel textures in BC4 format, respectively. In a conservative approach, separate models are generated for each kind of texture to encode and decode them more efficiently. It is noted that while the following discussion generally refers to texels and compression of texture data, the methods and mechanisms described herein are applicable compression of other types of data and any of a variety of block-based compression methods. As such, a given block as discussed herein may include multiple texels (of texture data) with each being a smallest unit of texture data. Alternatively, the block may include multiple pixels where the pixels each represent the smallest unit of a digital image. As discussed herein, the units within the block (e.g., texel or pixel) may be referred to as "data points" or "data values." Accordingly, a data point may refer to a texel or a pixel.

Further, to optimize storage, the disclosed systems and methods incorporate quantization-aware training (QAT) for the multi-resolution feature grids. By reconstructing block-compressed texture data during a texture loading phase, NTBC ensures seamless compatibility with existing graphics pipelines without requiring shader modifications. The described methods are customizable, offering conservative and aggressive compression approaches to balance storage efficiency and visual fidelity. Model inference times are low for high-resolution textures, thereby making NTBC suitable for real-time applications such as video games, virtual reality, and content streaming. The system outputs standard BC1 and BC4 formats, ensuring interoperability with existing GPU decompression techniques and demonstrating its capacity to integrate seamlessly into modern graphics workflows.

Referring now to FIG. 1, a block diagram of one implementation of a computing system 100 is shown. In an implementation, computing system 100 is configured to, amongst other functionalities, process data, such as but not limited to, texture data identified in a material, i.e., collection of multiple textures that represent various physical and visual properties of a material in a 3D scene or rendering application. Each texture captures a specific attribute of the material, such as its color, surface details, or reflectivity, and contributes to the overall visual realism. The system 100 is configured to store input texture data that includes multiple texture elements (texels) and one or more processors that are configured to partition the input texture data into a plurality of blocks. Each block includes multiple texels that are analyzed to identify representative color endpoints corresponding to a color range within the block. The system 100 encodes these color endpoints using a predefined encoding scheme and computes index values for each texel within the block, wherein the index values map the texels to the encoded color endpoints. The system 100 generates compressed texture data by combining the encoded color endpoints and index values for each block into a block-compression format (e.g., BC1). The system 100 further stores the compressed texture data for subsequent use in graphical rendering operations.

In one or more implementations, the system 100 executes specialized neural networks or machine learning models configured to process uncompressed blocks of texture data corresponding to a material's visual properties. Each uncompressed block of texture data includes multiple data points (texels). The neural networks include an endpoint prediction model and a color prediction model that are configured to generate block-compressed texture data in a format compatible with industry-standard compression schemes such as BC1 or BC4. In one implementation, the system 100 optimizes network parameters using quantization-aware training (QAT) to reduce storage requirements while preserving visual fidelity. The compressed texture data includes endpoints, and weight indices, which are computed using the endpoints and uncompressed color values for each block. The endpoints and uncompressed color values are predicted using neural networks. These and other implementations are described in further detail in the text that follows.

In one implementation, computing system 100 includes at least processors 105A-N, input/output (I/O) interfaces 120, bus 125, memory controller(s) 130, network interface 135, memory device(s) 140, display controller(s) 150, and display(s) 155. In other implementations, computing system 100 includes other components and/or computing system 100 is arranged differently. Processors 105A-N are representative of any number of processors which are included in system 100. In several implementations, one or more of processors 105A-N are configured to execute a plurality of instructions to perform functions as described with respect to FIGS. 2-6 herein.

In one implementation, processor 105A is a general-purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides data to display controller 150 to be driven to display 155.

Memory controller(s) 130 are representative of any number and type of memory controllers accessible by processors 105A-N. Memory controller(s) 130 are coupled to any number and type of memory devices(s) 140. Memory device (s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, television, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
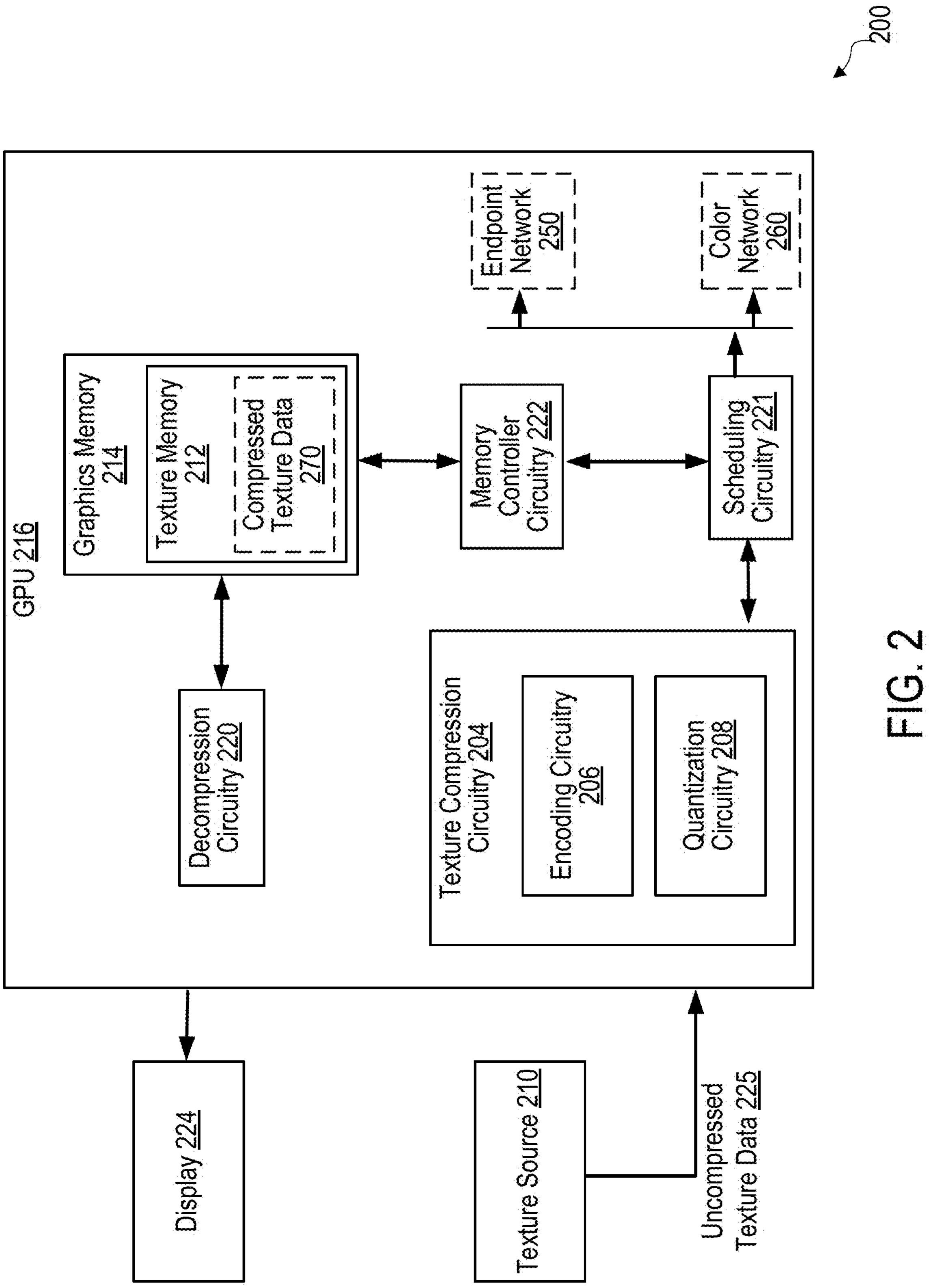
FIG. 2 illustrates a graphics rendering system for rendering graphics based on compressed texture data.

FIG. 2 is a block diagram illustrating a graphics rendering system 200 for rendering graphics based on compressed texture data. As shown in the figure, a texture source 210 generates uncompressed texture data 225, which is processed by the graphics rendering system 200. In an implementation, the texture source 210 includes a source device configured to generate uncompressed and unprocessed texture data 225. This device can include devices such as digital cameras, scanners, or specialized texture generation hardware. For instance, a digital camera captures high-resolution images and outputs raw image data in an uncompressed format without applying compression algorithms or post-processing. Similarly, a scanner can digitize physical images or textures and directly output data as raw texture information. Additionally, custom hardware devices, such as graphics processing units (GPUs) or texture synthesis engines, can generate procedural textures or acquire texture samples from the environment, storing or transmitting the data in an unaltered, uncompressed state for further use in rendering or computational processes.

The raw and unprocessed texture data 225 is received by GPU 216 which includes texture compression circuitry 204, decompression circuitry 220, and graphics memory 214, among other components, for processing the unprocessed texture data 225. In an implementation, the texture compression circuitry 204 is configured to compress the unprocessed texture data 225 to generate compressed texture data. In one or more implementations, various compression techniques can be employed to compress unprocessed texture data 225, including, but not limited to, lossy and lossless compression methods. Lossy compression techniques, such as Discrete Cosine Transform (DCT)-based methods, including JPEG, may reduce data size by selectively discarding less perceptually significant information. Alternatively, lossless compression methods, such as Run-Length Encoding (RLE), Huffman coding, or Deflate algorithms, preserve the integrity of the texture data while reducing redundancy. Advanced methods, such as block-based texture compression formats like Adaptive Scalable Texture Compression (ASTC) or S3 Texture Compression (S3TC), divide texture data into smaller blocks, for applying tailored compression schemes to achieve high compression ratios with minimal impact on visual fidelity. These techniques can be selectively applied based on factors such as storage constraints, processing power, or rendering requirements.

In one implementation, texture compression circuitry 204 is configured to compress texture data, e.g., using block compression by systematically processing raw texture data 225 through a series of defined steps. Initially, the input texture data 225 is divided into a plurality of fixed-size blocks, typically defined in dimensions such as 4×4 or 8×8 data points (e.g., pixels or texels), depending on the compression standard and data being compressed. The compression circuitry 204 is further configured to preprocess each block, e.g., to analyze the blocks' data point values, and other identifying characteristics such as color range, redundancy, or patterns that can be exploited for compression. The compression circuitry 204 further comprises encoding circuitry 206 that applies one or more mathematical transformations, such as Discrete Cosine Transform (DCT) or other encoding techniques, to convert spatial data into frequency-domain coefficients involving transforming the texture's texel data (spatial data) into a mathematical representation that describes how the data varies across the block in terms of frequency components. Each texel in the texture represents a point in the spatial domain, corresponding directly to its color or intensity value. This raw representation contains redundancy, such as uniform color regions or gradual gradients, which are not efficiently compressible in their original form.

In one implementation, the compression circuitry 204 also includes quantization circuitry 208 that is configured to perform quantization on these coefficients, reducing the precision of less significant frequency components while preserving visually critical details. Following quantization, the encoding circuitry 206 executes encoding techniques such as entropy coding, differential encoding, or predictive encoding to minimize the data size further. The compression circuitry 204 formats the compressed block, e.g., according to a predefined storage or transmission format, with additional metadata appended if necessary to facilitate decompression. The compressed blocks are then stored or transmitted as part of the complete texture data set, ready for use in rendering pipelines or other applications (such as gaming applications).

In one or more implementations, texture compression is often performed using formats such as block compression, which are supported by most modern GPUs and graphics APIs such as DirectX. These formats offer random-access property, which is desirable to be used on GPUs, where each 4×4 block of data points is compressed to a fixed number of bytes. In block compression, BC1 and BC4 formats compress each block to 8 bytes, while other formats compress each block to 16 bytes. Therefore, a single 4K texture compressed even with BC1 and BC4 requires 8 MB of storage, which reaches the magnitude of gigabytes for a scene with large number of 4K textures, as are common in modern high-quality games. To tackle this storage inefficiency of block compression, methods and systems described herein propose a Neural Texture Block Compression (NTBC) method, that reduces the storage and bandwidth requirements of the block compression formats. NTBC employs neural networks to compress texture blocks, achieving lower bit rates than the conventional block compression formats while the resulting block-compressed data have the same format as the conventional block compression. The description that follows focuses on the BC1 and BC4 formats, which are most widely used for RGB and single-channel textures, respectively. However, in alternate implementations, texture compression using other formats can similarly be performed the methods described herein.

Referring again to FIG. 2, to achieve NTBC, the system 200 operates to compress the uncompressed texture data 225 into block-compressed formats, such as BC1 and BC4, utilizing a neural texture compression approach. The system 200 integrates machine learning techniques to optimize the conversion of texture data into standard block-compressed formats, ensuring efficient storage and high visual fidelity. Initially, the circuitry 204 processes uncompressed texture data 225 by dividing it into fixed-size blocks, typically 4×4 texels. As described earlier, each block undergoes analysis to determine spatial and color variations. This data serves as an input to a plurality of neural networks during a training phase for each neural network. In one implementation these neural networks at least comprise an endpoint network 250 and a color network 260. By executing the endpoint network 260, predictions are generated for endpoints of each block, e.g., defining a color range within the block. Further, executing the color network 260 predicts original uncompressed colors for the texture.

In one or more implementations, GPU 216 is configured to train neural networks and execute the trained neural networks. The GPU 216 includes, in one example, scheduling circuitry 221, a memory controller circuitry 222, one or more compute units (not shown). In one implementation, training is performed during a pre-processing stage (described in FIG. 3), where neural network parameters are updated based on loss functions computed from sample datasets. Execution of trained neural networks is subsequently performed in post-processing to reconstruct texture blocks from compressed texture data 270.

In an implementation, scheduling circuitry 221 dynamically assigns neural network tasks to available GPU cores based on workload distribution, ensuring efficient execution of training and inference computations. The memory controller circuitry 222 manages execution flow by coordinating memory access, handling communication between compute units, and optimizing synchronization between various pipeline stages.

In an implementation, for each block of texture data, individual endpoint and color networks can be programmed. In such implementations, the endpoint network 250 is trained to predict two endpoints for each block of texture in specific block compression formats, such as BC1 and BC4. For a given block of texture data, the endpoint network 250 takes two-dimensional (2D) normalized block indices as input, which are encoded using multi resolution feature grids. The network 250 is trained to output predicted endpoints for the given block of texture, which define colors for the color palette or range in the given block. In an implementation, to train the endpoint network 250 a loss function is chosen that minimizes the error between the predicted endpoints and reference endpoints obtained using traditional compression tools. The training procedure also includes training the endpoint network using errors from weight index computations (as described in FIG. 5). The predicted endpoints, combined with weight indices, reconstruct the colors for each block, e.g., through linear interpolation. In one example, the endpoint network is a multilayer perceptron (MLP) network with input, hidden, and output layers. More details on the endpoint network 250 are presented in FIG. 4.

In an implementation, the color network 260 is trained to predict original uncompressed colors for all textures at a given texture coordinate of a texel, thereby enabling the reconstruction of compressed data indirectly through calculated weight indices. In one example, the color network 260 is inputted with 2D texture coordinates of the texture, e.g., encoded using multi-resolution feature grids. The network 260, when executed, outputs predicted uncompressed colors for the textures. In one or more implementations, the color network 260 is trained with a loss function that minimizes the error between predicted and reference uncompressed colors. The training process also utilizes the decoded color errors based on reconstructed weight indices (as described in FIG. 5). The color network 260 facilitates computation of the weight indices by comparing the predicted colors to the endpoints' interpolated colors. In an implementation, the texture compression circuitry 204 uses the outputs of the endpoint network 250 and color network 260 to generate compressed block data, e.g., by calculating weight indices from arithmetic distances between predicted colors and interpolated palette colors. More details on the color network 260 and generation of compressed texture data are presented in FIG. 4.

In an implementation, inputs to both the endpoint network 250 and color network 260 are encoded using multi resolution feature grids. Feature grids are multi-dimensional arrays storing compressed features (often lower-dimensional latent vectors) instead of direct pixel or voxel data. That is, instead of storing textures or high-dimensional details explicitly, a feature grid encodes the texture data information in a latent space. Compressing uncompressed texture data 225, such as 2D texture coordinates and/or 2d block indices, into grids reduces storage requirements while retaining pertinent information for high-quality reconstructions. In an example, when using multi-resolution feature grids, smaller MLPs can be sufficient to access the feature vector from the grid and decode it to reconstruct the original texture or detail.

Figure 4:
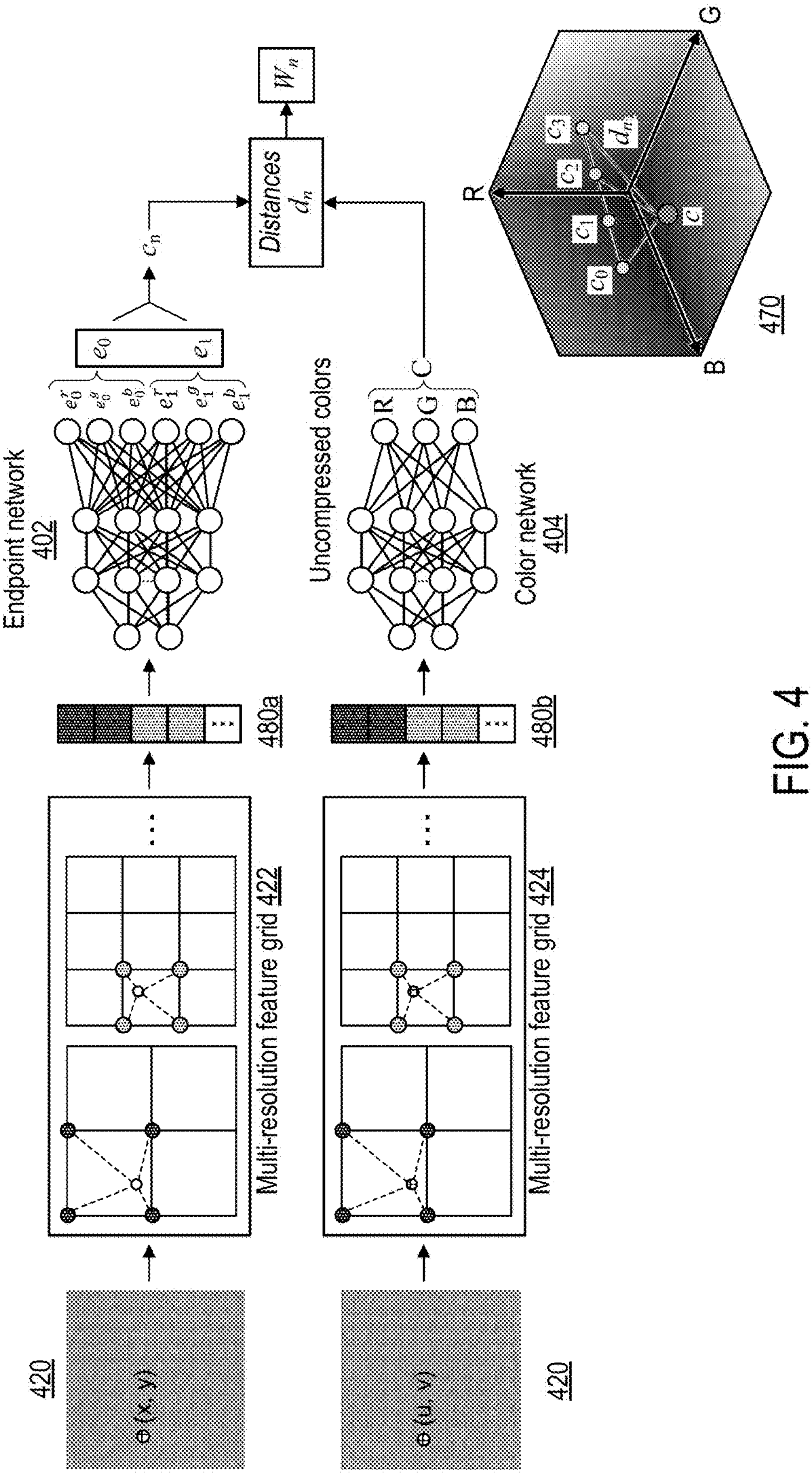
FIG. 4 illustrates a block diagram describing generation of weight indices representing compressed texture data using neural networks.

The GPU 216 uses the predicted uncompressed color value for each texel of the texture and endpoints for each block of texture to calculate weight indices for the block (as described in FIG. 4). A given weight index, in one example, maps a texel to its corresponding colors within the color range. In an implementation, to construct the final block-compressed data, the circuitry 204 combines the predicted endpoints, and the computed weight indices into a specific format that represents the block compressed texture data. For example, for the BC1 format, the encoding circuitry 206 encodes three-channel RGB textures using two RGB565 endpoints and a 2-bit index per texel. Similarly, for the BC4 format, single-channel data is encoded using two 8-bit endpoints and a 3-bit index per texel.

The graphics rendering system 200 is further configured to apply advanced quantization techniques, leveraging quantization-aware training (QAT) to minimize storage costs without significant quality degradation. In one implementation, quantization circuitry 208 is configured to store the feature grids and network weights as quantized 8-bit integers, which are dequantized during execution of the neural networks. The texture compression circuitry 204 then executes a two-stage training and execution process. During training, the endpoint network 250 and the color network 260 optimize the predicted endpoints and colors, respectively, using combined loss functions that penalize discrepancies between predicted and reference uncompressed textures. When executed, the trained networks 250 and 260 reconstruct compressed texture data in real-time, which enables compatibility with existing rendering pipelines. This approach ensures the texture compression circuitry 204 achieves a significant reduction in texture storage requirements, while maintaining high-quality outputs suitable for real-time graphics applications. The ability to encode multiple textures simultaneously enhances its efficiency for complex materials, such as those containing diffuse, normal, and roughness maps.

In one implementation, the compressed texture data 270, e.g., outputted by executing the endpoint network 250 and the color network 260 is saved in a texture memory 212 which is part of a graphics memory 214. In one or more implementations, graphics memory 214 can be internal to the GPU 216 or external to the GPU 216. Further, the GPU 216 can include one or more caches. In one example, the texture memory 212 is a specialized type of memory used to store texture data in compressed formats that is mapped onto 3D models. For example, texture memory 212 stores compressed texture of 2D images applied to a 3D object in a video game, enabling GPU 216 to fetch and decompress the texture during rendering. In one or more implementations, graphics memory 214 includes VRAM, Graphics DDR, SDRAM, and the like. Other implementations are possible and are contemplated. Further, texture memory 212 is allocated as a contiguous block in the graphics memory 214, e.g., using APIs like Vulkan, DirectX, and OpenGL. Further, a texture object or descriptor is created, acting as a reference to the allocated graphics memory 214 space.

In one implementation, decompression circuitry 220 accesses the compressed texture data from the graphics memory 214 for decompression. The decompression circuitry 220 accesses segments of the compressed texture data and uses one or more processing circuitries (not shown) to decompress the data into raw pixel data suitable for rendering. The decompression circuitry 220 can render small portions of the texture map at any given time. In one implementation, the compressed texture data is designed for selective access, allowing specific segments of the compressed texture to be loaded for the decompression circuitry 220. Once decompressed, the relevant portion of the texture is output by the decompression circuitry 220 and temporarily stored in a texture cache (not shown) for rendering use.

In an implementation, as and when requested by applications, GPU 216 can extract decompressed texture data, such as image or pattern information, from the texture cache. This decompressed texture data can be further processed, e.g., performing texture mapping operations, including coordinate transformations and filtering, to apply the textures to graphical objects. The rendered graphical output is then transmitted to an output display device 224, such as a liquid crystal display (LCD), organic light-emitting diode (OLED) screen, or a virtual reality (VR) headset, for visual presentation.

The systems and methods described herein enable mitigating storage inefficiency of compressed texture data, especially those compressed using block compression. The proposed solutions employ neural networks to compress texture blocks, achieving lower bit rates than the conventional block compression formats while the resulting block-compressed data have the same format as the conventional block compression. In the described methods, execution for the endpoint networks and the color networks are executed in a shader program to compute texel values. In another implementation, neural texture block compression is used to execute trained neural networks at the time of texture loading from the disk to generate block compression data of the entire texture, and then the resulting compressed textures are stored in a graphics memory. By doing so, no changes in the shaders are required, which makes it easier to adapt to existing graphics pipelines. The following description focuses on the BC1 and BC4 formats, which are most widely used for RGB and single-channel textures, respectively. In alternate implementations, however, texture compression using other block compression formats can also be realized using the systems and methods described. Such implementations are contemplated.

Figure 3:
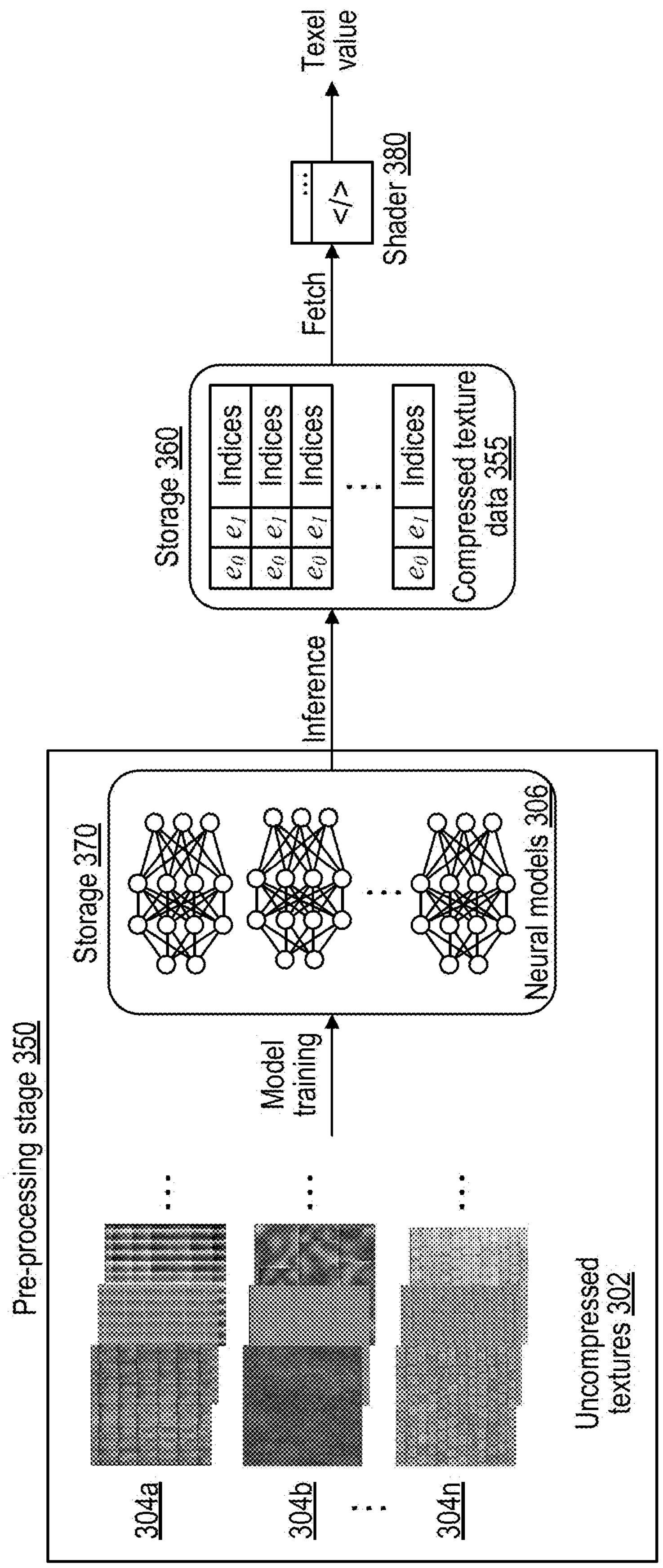
FIG. 3 illustrates a block diagram describing neural texture block compression (NTBC).

FIG. 3 is a block diagram illustrating neural texture block compression (NTBC). As described earlier, NTBC employs multi-layer perceptron (MLP) networks to map uncompressed textures directly into block-compressed formats. The MLP networks include a first neural network comprising an endpoint network that predicts endpoints for each 4×4 texture block. Further, a second neural network includes a color network which predicts original colors of uncompressed textures. As shown in the figure, uncompressed textures 302 correspond to textures found in different materials. Each material 304*a* to 304*n* are made up of multiple raw textures. In an implementation, each material 304 is defined as a combination of textures that collectively determine the appearance and physical attributes of a surface. Each texture represents a specific property of the material 304. For instance, a diffuse texture provides the base color and overall look of the material 304 under lighting. In another example, a specular texture defines the intensity and color of reflected light, giving the material a shiny or matte appearance. Additional maps, such as roughness, metallic, and displacement maps, further refine the material 304 by controlling surface irregularities, metallic reflection properties, and geometric distortions, respectively. For example, a realistic wood material 304 includes a diffuse texture showing the wood grain, a normal map to emphasize the ridges in the grain, and a specular texture to simulate the subtle shine of polished wood.

In an implementation, the uncompressed textures per material 304 are used as training data for multiple neural network models 306. In an example, these neural network models 306 are stored on storage 370, e.g., hard drive or Non-Volatile Memory Express Solid State Drive (NVMe-SSD) corresponding to a graphics rendering system (such as system 200 discussed in FIG. 2). The models 306 are trained during a graphics preprocessing stage 350, as shown. In the graphics preprocessing stage 350, training neural network models 306 using uncompressed texture data involves preparing the networks 306 to effectively map high-resolution, uncompressed texture inputs to optimized compressed formats suitable for real-time rendering. In one implementation, individual neural network models 306 are trained for different textures of each material 304, e.g., to generate weight indices, which form the compressed texture data.

In operation, uncompressed texture data, typically stored in formats like raw bitmaps, is first divided into blocks of fixed size (e.g., a block of texels formed using 4×4 texels), e.g., to match the granularity of block-based compression formats. Each block of texels includes a groups of texels (e.g., 4×4, 8×8, etc.), depending on a compression format. In one example, each material 304*a* to 304*n* is divided into individual blocks. Each block represents a small, localized section of the texture 304, retaining its spatial and color characteristics. The blocks are further preprocessed to normalize texel or pixel values, encode positional data, and augment the dataset with transformations to improve model robustness. The neural network models 306 used for neural block texture compression essentially include two components, namely, an endpoint prediction network, which is trained to predict endpoints of compressed color range for each block. These endpoints define the minimum and maximum colors in the compressed palette. The other component includes a color prediction network which predicts the uncompressed texel colors for mapping texels to the compressed palette. Both networks are designed with compact architectures, such as multi-layer perceptron (MLP), to minimize computational overhead during execution. In one implementation, for training the models, input features for the networks include multi-resolution feature grids encoding spatial texture information (as described in FIG. 4). Further, during runtime, a given endpoint network and color network is executed once per material 304 to obtain the block compressed texture data 355.

In an implementation, compression circuitry in a graphics rendering system (e.g., compression circuitry 204) is configured to train models 306 using reference values for endpoints and uncompressed colors. For instance, endpoint networks are trained using an endpoint prediction loss that penalizes discrepancies between predicted and reference endpoints, e.g., derived from traditional compression tools (e.g., "Compressonator"). Similarly, the color networks are trained using a color reconstruction loss that ensures that reconstructed texels derived from predicted endpoints and indices closely match the uncompressed texels. In one implementation, the loss for color reconstruction is further computed between predicted uncompressed colors and the reference uncompressed colors. Additionally, reconstructed texel colors derived from the reference endpoints and predicted indices are compared to the reference texel colors, to compute the gradients for the predicted indices difference. The combined loss function balances these training objectives enabling the overall neural network architecture towards accurate compression. In one implementation, to further optimize storage and computation, quantization-aware training is employed. During this phase, weights and feature grids for each network 306 are quantized to lower precision (e.g., 8-bit integers) while preserving the overall model performance. This ensures compatibility with lightweight hardware and reduces storage costs in the preprocessing stage. These and other implementations are further described with respect to FIG. 5.

Once trained, the compression circuitry integrates these models 306 into the preprocessing stage 350 of the graphics pipeline. The uncompressed texture data is passed through the neural networks 306 to generate compressed blocks in formats like BC1 or BC4. The resulting compressed texture data 355 is stored in the graphics or GPU memory, such as storage 360, to be used in real-time rendering operations. The storage can include VRAM, in one implementation. In one example, the compressed texture data 355 is represented by endpoints ($e_0$ and $e_1$) and indices generated for each individual block. A shader 380 implemented within the graphics rendering pipeline retrieves compressed texture data 355 stored in the VRAM 360 and processes the data to generate corresponding texel values. In one or more implementations, this involves accessing texture blocks in their compressed format, decoding the compressed data using a specified compression algorithm, and reconstructing the original texture information. The shader 380 utilizes the decompressed texel values to perform operations such as texture mapping, blending, and filtering to achieve the desired visual effects in rendered scenes.

FIG. 4 is a block diagram illustrating generation of weight indices representing compressed texture data using neural networks. The figure describes processing of a single block of each texture using neural networks for determining the endpoints and weight indices for the block. The process is simultaneously performed for each block identified in each texture. It is noted that functionalities described herein with respect to execution of neural network models, computation of weight indices, and storing of weight indices and endpoints as compressed texture data is performed by a graphics rendering system (e.g., system 200), e.g., by means of a compression circuitry (e.g., circuitry 204).

In one or more implementations, weight indices are used to facilitate linear interpolation between the endpoints. In one example, each weight index corresponds to a pre-computed or dynamically generated value associated with a texel, representing its relative contribution to the interpolated result. In one example, compression format BC1 encodes 4×4 blocks into 8-byte structures. This format has two 16-bit RGB565 endpoints and a set of 16 2-bit indices to look up the corresponding texel color from a color palette. The palette contains four colors with two additional colors linearly interpolated between the endpoints. In another example, BC4 is a specialized version of BC1 for single-channel images. While utilizing the same 8-byte block size as BC1, BC4 employs two 8-bit endpoints and a 3-bit index per pixel to reference an 8-color palette. This palette consists of the endpoints and either four or six linearly interpolated values, depending on whether the first endpoint numerically exceeds the second. Compressed textures are represented using weight indices and endpoints. During decompression, the system reconstructs texel values by applying linear or non-linear interpolation between the endpoints, guided by the weight indices. This representation enables the storage of complex texture information in a compact format, significantly reducing memory usage and bandwidth requirements.

In one or more implementations described herein, different neural networks are trained to predict data (endpoints and weight indices) that is used to represent compressed texture data. Each texture 420 is compressed into a fixed-size structure (e.g., 4×4 blocks), with limited color variation. Further, colors are approximated as evenly spaced along a line segment in RGB space. Each texture 420 contains a color palette with colors on this line segment (colors $c_0$ to $c_3$ shown in graph 470). Linear interpolation is performed using weight indices between endpoints (represented by $e_0$ and $e_1$) corresponding to a block of texture 420, e.g., to determine colors $c_0$-$c_3$ on the palette.

In one implementation, neural networks include an endpoint network 402 and a color network 404. For the endpoint network 402, input parameters include 2D block indices (x, y) of each block of texture 420. This input parameter is encoded using a first multi-resolution feature grid 422. As shown, the multi-resolution feature grid 422 encodes the 2D indices of the block of texture 420, which in turn is fed to the endpoint network 402 for further processing. In one example, the multi-resolution feature grid 422 is a hierarchical representation encoding a texture across multiple scales or resolutions. In one implementation, for the endpoint network 402, the multi-resolution feature grid 422 includes seven levels, with resolutions ranging from 16×16 (low resolution) up to 1024×1024 (high resolution). In one implementation, each resolution level corresponds to a grid with a specific spatial resolution. For instance, a coarse grid (16×16) includes a lower resolution (fewer grid points), while a finer grid (1024×1024) has a higher resolution (more grid points). The indices (x, y) of the block of texture 420 are mapped to positions in each resolution level of the feature grid 422. Depending on the grid resolution, at coarse levels, a block corresponds to fewer, larger grid cells. At finer levels, the same block corresponds to more, smaller grid cells. At each level, the grid 422 provides a feature vector corresponding to the indices of the block of texture 420. The size of this vector is defined by the number of 2D features per level (e.g., 14-dimensional feature vectors). Features from multiple levels are aggregated to provide a multi-scale representation of the texture 420.

In another implementation, texture coordinates (u, v) of texture 420 are encoded using a second multi-resolution feature grid 424. In one example, each texture coordinate is represented using floating-point values (u, v), where: "u" corresponds to the horizontal axis of the texture, and "v" corresponds to the vertical axis of the texture. As shown, the multi-resolution feature grid 424 encodes the texture coordinates of the texture 420, which in turn is fed to the color network 404 for further processing. At each level, the grid 424 provides a feature vector corresponding to the coordinates of the texture 420. The size of this vector is defined by the number of 2D features per level (e.g., 16-dimensional feature vectors). In one implementation, for the color network 404, the multi-resolution feature grid 424 includes eight levels, with resolutions ranging from 16×16 (low resolution) up to 2048×2048 (high resolution). The coordinates (u, v) are mapped to positions in each resolution level of the feature grid 424.

In one implementation, each multi-resolution feature grid 422 and 424 is stored as concatenated feature vectors 480*a* and 480*b* respectively, e.g., by leveraging the spatial distribution of color channels to encode feature information at different levels of detail. In one example, each resolution level of the feature grids 422 and 424 corresponds to a discrete texture grid (e.g., 16×16, 32×32, up to 1024×1024 for grid 422 and up to 2048×2048 for grid 424), where each vertex stores a feature vector, such that the dimension of each feature vector is two dimensional, and all feature vectors from all levels are concatenated to form a one large vector, e.g., a 14 dimensional vector 480*a* for the endpoint network 402. This concatenated feature vector 480*a* represents attributes compactly and is used as the input to the networks. The concatenated vector 480*a* represent attributes such as color, material properties, or surface normal (normal vectors), compactly packed into three channels for optimized memory usage. Similarly, concatenated vector 480*b*, e.g., a 16-dimensional vector, is used as input for the color network 404. The vectors 480*a* and 480*b* are used as input parameters to execute (once per material) the endpoint network 402 and the color network 404, to predict RGB endpoints for each block of texture 420, and uncompressed color value for each texture 420, respectively.

As shown in the figure, the endpoint network 402 predicts, for each 2D block index of blocks of texture 420, RGB endpoints (i.e., two endpoints for each RGB color), that are cumulatively represented as endpoints of the texture 420. In the described implementation, the endpoint network 402 predicts first endpoints $$(e_0^r, e_0^g, e_0^b)$$

and second endpoints $$(e_1^r, e_1^g, e_1^b).$$

These points represent the endpoints of the texture 420 ($e_0$ and $e_1$). Colors on the palette, represented by color palette value $c_n$ (e.g., $c_0$ to $c_3$ in case of BC1 and $c_0$ to $c_7$ in case of BC4) are then computed using these endpoints. Exemplary sequences used to compute the color palette value for BC1 format is as shown below:

$$c_0 = e_0$$

$$c_1 = \frac{2}{3}e_0 + \frac{1}{3}e_1$$

$$c_2 = \frac{1}{3}e_0 + \frac{2}{3}e_1$$

$$c_3 = e_1$$

Similarly, for BC4, the color palette value is computed using the following sequences:

$$\text{if } e_0 > e_1$$

$$c_0 = e_0$$

$$c_1 = \frac{6}{7}e_0 + \frac{1}{7}e_1$$

$$c_2 = \frac{5}{7}e_0 + \frac{2}{7}e_1$$

$$c_3 = \frac{4}{7}e_0 + \frac{3}{7}e_1$$

$$c_4 = \frac{3}{7}e_0 + \frac{4}{7}e_1$$

$$c_5 = \frac{2}{7}e_0 + \frac{5}{7}e_1$$

$$c_6 = \frac{1}{7}e_0 + \frac{6}{7}e_1$$

$$c_7 = e_1$$

$$\text{if } e_0 \le e_1$$

$$c_0 = 0$$

$$c_1 = e_0$$

$$c_2 = \frac{4}{5}e_0 + \frac{1}{5}e_1$$

$$c_3 = \frac{3}{5}e_0 + \frac{2}{5}e_1$$

$$c_4 = \frac{2}{5}e_0 + \frac{3}{5}e_1$$

$$c_5 = \frac{1}{5}e_0 + \frac{4}{5}e_1$$

$$c_6 = e_1$$

$$c_7 = 1$$

In an implementation, the color network 404 predicts, for the texture 420, uncompressed color values "C" representing the RGB color format. As shown in the graph 470, for BC1 format the color value C is located at a fixed distance from all colors $c_0$ to $c_4$ on the color palette. The color network 404 is executed to predict individual color values for each R, G, and B color represented in the concatenated feature vector 480*b*, and these values are used to represent a single color value C representing uncompressed colors of the texture 420. The compression circuitry is then configured to generate the uncompressed color value C using individual RGB color values.

The system is configured to generate compressed blocks of texture data using the endpoints ($e_0$ and $e_1$) and the uncompressed color value C. To do so, the system first computes an arithmetic distance between the values of colors on the palette and uncompressed color value C. The arithmetic distances are generated to compute the value of $W_n$, wherein $W_n$ is 2-bit weight index per texel for BC1 and 3-bit weight index per texel for BC4. As shown for BC1 format in the graph 470, the distance ($d_n$) represents a distance between each color on the palette ($c_0$ to $c_3$) from the uncompressed color value C. In one implementation, the weight index per texel is calculated using an "argmin" function. First, the system calculates arithmetic distances between a given first value (herein C) and a series of points on a straight line (e.g., color values $c_0$ to $c_3$ for BC1). An exemplary sequence for calculating the distances is as shown below:

$$d_n = |C - c_n|$$

Wherein, n is equal to (0<=n<=3) for BC1 format, and (0<=n<=7) for BC4 format.

Next, the values of $d_n$ are used to calculate the values of $W_n$ using the argmin function. Using this function, the system determines a specific index (n) for which $f(d_n)$ attains its minimum value across the color palette. That index is used as the weight index per texel for the texture 420. The system stores the endpoints ($e_0$ and $e_1$) for each block index of the texture 420, along with weight indices ($W_n$) for every pixel/texel in the texture 420, as compressed texture data for the block 420.

In an implementation, the endpoint network 402 and color network 404 are executed, during a preprocessing stage in the graphics pipeline, once per identified material. In one implementation, to reconstruct one block of texture 420, execution of the color network 404 needs to be performed once for each texel within a block (e.g., 16 times for a 4×4 block of texels), and once for the endpoint network 402 (i.e., once per block). Further, the resulting compressed textures are stored in the graphics or GPU memory (such as VRAM), to be used in real-time rendering operations. In an example, shaders implemented within the graphics rendering pipeline can retrieve compressed textures and processes the data to generate corresponding texel values. Furthermore, quantization-aware training (QAT) can be used for training the endpoint network 402 and color network 404, e.g., to reduce the size of the networks as well as resulting execution costs. This can be done by converting network weights and activations from high-precision floating points to low-precision integers. In the methods described herein, the QAT is applied to multi-resolution feature grids by converting floating-point features into 8-bit integer features. Training of the neural networks is further detailed with respect to FIG. 5. The systems and methods described herein allow for usage of existing graphics pipeline with reduced storage size of block-compressed textures. Further, as decompression methods can be used as-is, the real-time performance remains constant and execution time which occurs at the time of texture loading is only a modest performance overhead.

Figure 5:
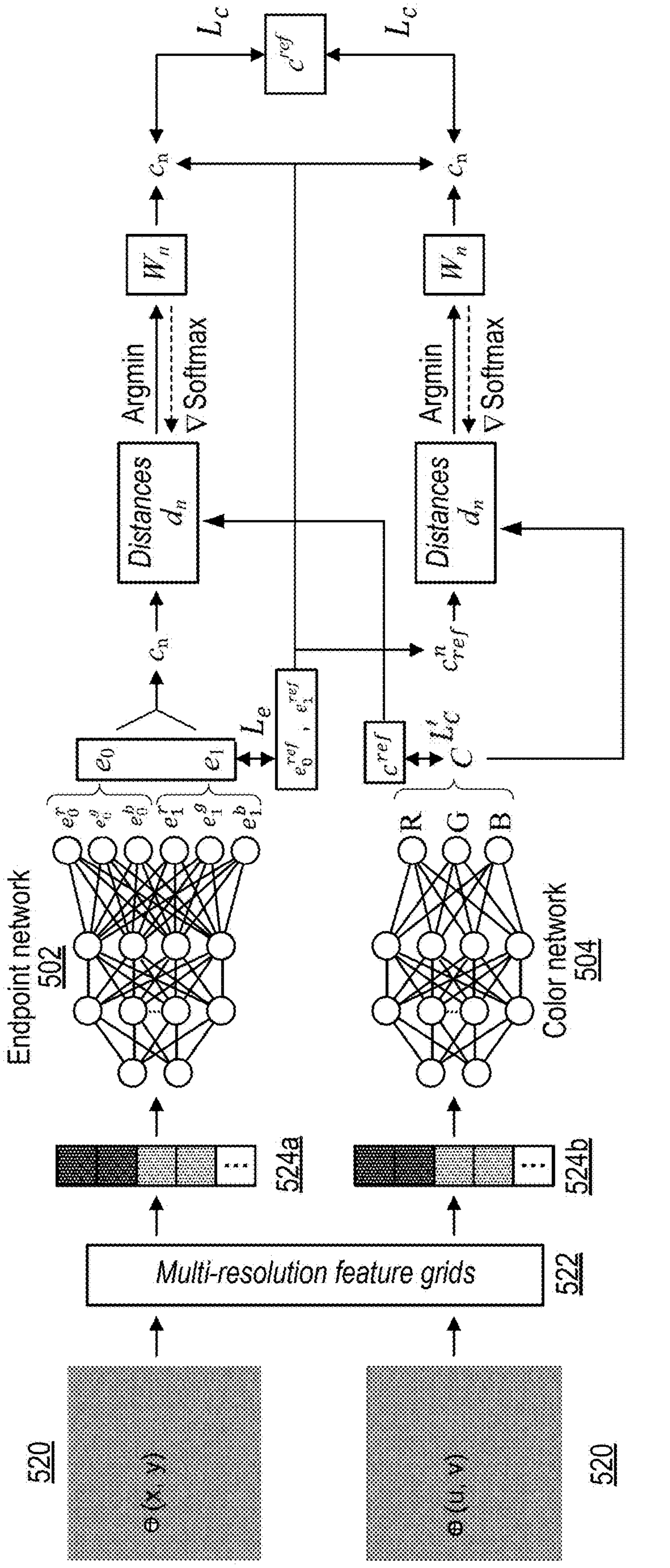
FIG. 5 illustrates a block diagram describing training and optimization methods for the endpoint and color networks.

FIG. 5 is a block diagram illustrating training and optimization methods for the endpoint and color networks. The training methodologies described herein are performed by a processing circuitry (e.g., GPU 216 described in FIG. 2). The processing circuitry can include multiple components, each specialized to perform one or more functionalities described herein. These can include processing units, e.g., (CPU, GPU, TPU, etc.) configured to execute parallelized matrix computations. The circuitry can further include memory components such as operatively coupled to the processing units for storing weights, gradients, and datasets. The circuitry further includes multiply-accumulate (MAC) units and systolic arrays to accelerate matrix multiplications, with interconnects such as NVLink, PCIe, or Network-on-Chip (NoC) facilitating high-speed data transfer. Analog components including memristors and neuromorphic circuits may be implemented for low-power synaptic computations. Further, power management systems comprising voltage regulators and thermal management components ensure energy efficiency during computations. The circuitry is configured for training neural networks by efficiently performing tensor operations, matrix multiplications, and synaptic updates, utilizing hardware-level parallelization and optimized data flow.

In one or more implementations, the endpoint and color networks are trained by the compression circuitry independently using combined loss to facilitate optimizations for both colors and weight indices. During the training procedure, first, the endpoint and color networks learn optimal endpoints and uncompressed colors with a loss for reference endpoints and reference uncompressed colors, respectively. Reference endpoints are obtained from block-compressed data computed with texture analytic tools, e.g., "Compressonator". Further, for both networks, additional losses for decoded colors derived from reconstructed 2-bit indices are used to consider an error from the weight index computation.

As shown in the figure, the circuitry encodes 2D block index and texture coordinates for a texture 520 using multi-resolution feature grids 522. This is as previously explained with respect to FIG. 4. During training of each of the endpoint network 502 and color network 504, these multi-resolution feature grids 522 are quantized to lower precisions. This enables quantization aware training (QAT) for the networks. In one implementation, QAT is a technique used for neural networks to reduce network size and execution costs by converting network weights and activations from high-precision floating points to low-precision integers. In this example, QAT is applied to the multi-resolution feature grids 522 to convert their floating-point features into 8-bit integer features. The networks are first trained with the half-precision floating points. Then, only the feature grids 522 are quantized into 8-bit discrete values using QAT, and the networks are fine-tuned using quantized feature grids 522. In one implementation, to quantize the feature grids 522, asymmetric quantization for each level of the grids 522 is conducted, where the quantized range is computed by taking the minimum and maximum values in each level of grids 522. In one implementation, each multi-resolution feature grid 522 represents concatenated feature vectors, e.g., 524*a* and 524*b* respectively, e.g., by leveraging the spatial distribution of color channels to encode feature information at different levels of detail.

In one or more implementations, the circuitry independently trains the endpoint network 502 and color network 504 using a combined loss to facilitate optimizations for both colors and weight indices. In such implementations, the endpoint network 502 and the color network 504 learn optimal endpoints and uncompressed colors, respectively, with a Mean Squared Error (MSE) loss for reference endpoints $e_0$, $e_1$ (given by $L_e$) and reference uncompressed colors $C_{ref}$ (given by $L'_C$), respectively. Further, reference endpoints $$e^0_{ref}, e^1_{ref}$$

are obtained from block-compressed data, e.g., computed with Compressonator. Further, for both networks, an additional MSE loss for decoded colors derived from $$e^0_{ref}, e^1_{ref},$$

and reconstructed 2-bit indices n are used to consider an error from the weight index computation. The combined training loss used for each network is given by the following exemplary sequence:

$$L_{endpoint}=L_e+L_C\text{—}(1)$$

$$L_{color}=L'_c+L_C\text{—}(2)$$

As shown in FIG. 5, to compute the 2-bit index n for each texel, the circuitry uses predicted endpoints $e_0$, and $e_1$ and reference colors $C_{ref}$ for the endpoint network 502, while reference endpoints $$e^0_{ref}, e^1_{ref}$$

and predicted uncompressed colors C are used for the color network 504. With this weight index n and reference endpoints $$e^0_{ref}, e^1_{ref},$$

the final decoded colors are computed. However, since the argmax operation is not differentiable, the networks cannot be directly optimized using the loss $L_C$ in sequences 1 and 2 shown above. To solve this problem, the circuitry uses backpropagation of gradients through the argmax operation. For example, in the forward pass, the argmax operation of $d_n$ (computed arithmetic distances between uncompressed color "C" and colors on the palette $c_0$ to $c_3$), to obtain a weight index n. Further, in the backward pass, the gradients of the Softmax of $d_n$ weighted by the corresponding weight $W_n$=n/3 are propagated. In other words, the gradients in the backward pass can be computed assuming an expectation of the weights $W_n$, with the normalized probability computed with the Softmax operation, is being taken. Further details of this gradient computation are omitted for the sake of brevity.

In one implementation, in order to optimize the neural networks, the circuitry uses small MLPs for creating the endpoint network 502 and color network 504. Each of these MLPs include, in one example, three hidden layers with 64 neurons each with half-precision floating points. Further, a sigmoid activation function is applied to all output layers of the networks, so as to enable the networks to predict values in the range of [0,1]. In another implementation, the multi-resolution feature grids 522 have different configurations for 2D block indices and texture coordinates. The 2D block indices are represented using 7 levels with the finest resolution of 1024×1024, while for 2D texture coordinates, 8 levels with the finest resolution of 2048×2048 can be employed. All grids 522 include 2D features per level and a coarsest resolution of 16×16. These described grid configurations result in 14-dimensional inputs for the endpoint network 502 and 16-dimensional inputs for the color network 504. Further, as described earlier, grid quantization is applied to reduce the model size.

In one or more implementations, the neural texture block compression, using the endpoint and color networks described herein, can be performed in one of two approaches. In the first approach, the compression circuitry uses two different models (wherein a "model" includes the endpoint network 502 and color network 504 configured for each material) separately to encode textures using different block compression formats. For example, separate models are used to encode textures in BC1 and BC4 formats. This would include two different feature grids and MLP based endpoint and color networks. In a second approach, a single model learns BC1 and BC4 textures simultaneously. When encoding BC4 textures, the model computes 8 different arithmetic distances (ranging from $d_0$ to $d_7$). Further, when using the model to encode textures in the BC1 format, the last four distances, i.e., $d_4$ to $d_7$ are used as dummy distances, since BC1 format would only require computation of 4 distances ($d_0$ to $d_3$).

In an implementation, the first approach is a conservative approach used to compress RGB and single-channel textures separately using two distinct models. For RGB textures, the model is trained with BC1 compression, employing six and three output nodes for the endpoint, and color networks, respectively. On the other hand, single-channel texture compression relies on a BC4-trained model with two and one output nodes for the endpoint and color networks, respectively. This approach may suffer from inefficiencies due to the storage overhead of maintaining two separate models. In contrast, for the second approach, which is an aggressive approach, a single model is used to compress both RGB and single-channel textures to improve storage efficiency. This model is trained jointly for BC1 and BC4 by incorporating dummy nodes in computing distances $d_n$, as described above. For this model, output nodes include six RGB nodes and two single channel nodes for the endpoint network 502. Further, for the color network 504, three RGB nodes and one single channel nodes are required. This approach reduces the storage footprint compared to the conservative approach but may increase training complexity due to the need to learn the characteristics of both compression formats. Other approaches that are a combination of the above described approaches are possible and are contemplated.

Figure 6:
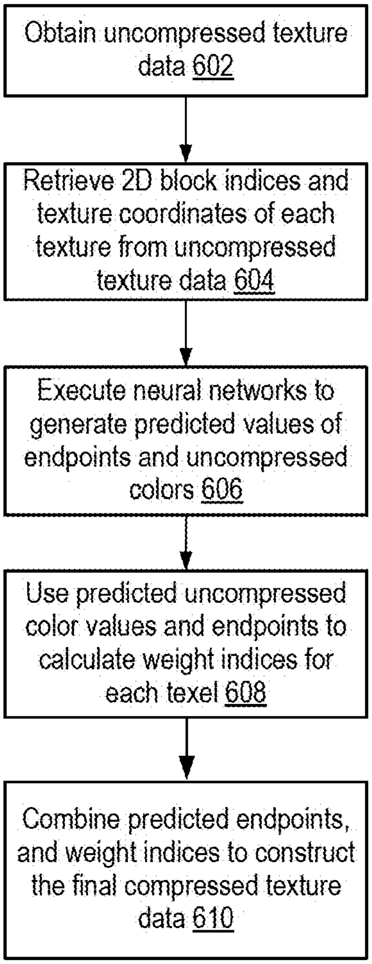
FIG. 6 illustrates a method for generating compressed texture data using neural networks.

FIG. 6 illustrates a method for generating compressed texture data using neural networks. In an implementation, a texture source generates uncompressed texture data, which is obtained by a graphics rendering system (block 602). In an implementation, the texture source includes one or more source devices configured to generate uncompressed and unprocessed texture data. These devices can include devices such as digital cameras, scanners, or specialized texture generation hardware. Next, 2D block indices of each block of texture, and texture coordinates of each texture are retrieved from the uncompressed texture data.

The neural networks at least include two MLP-based neural networks for each individual material forming the texture data. The first neural network comprises an endpoint network that predicts endpoints for each texture block. The second neural network is a color network which predicts original colors of uncompressed textures. A graphics rendering system executes these neural network during a pre-processing stage in a graphics pipeline, e.g., to generate predicted values of endpoints for each block of texture and uncompressed color values for the texture i.e., uncompressed colors for all the textures in a texture set at any given texture coordinate (block 606). In an implementation, to encode inputs to these neural networks, multi-resolution feature grids are used that allows for usage of small MLPs and encourages model optimization. The described neural networks are optimized specifically for one material having multiple textures, such that the models can encode and decode multiple textures in a material at once, differentiating them from conventional block compression processes.

The compression circuitry uses the predicted uncompressed color values the texture and endpoints for each block of texture to calculate weight indices for each block of the texture (block 608). A weight index, in one example, maps a corresponding texel to its corresponding colors within the color range. In an implementation, the circuitry combines the predicted endpoints and computed weight indices into a specific format, to construct the final compressed data (block 610). For example, for the BC1 format, the circuitry encodes three-channel RGB textures using two RGB565 endpoints and a 2-bit index per texel. Similarly, for the BC4 format, single-channel data is encoded using two 8-bit endpoints and a 3-bit index per texel. In one example, the compressed texture data, e.g., outputted by executing the endpoint network and the color network is saved in a texture memory.

The described neural networks are optimized specifically for one material having multiple textures, such that the models can encode and decode multiple textures in a material at once, differentiating them from conventional block compression processes. Additionally, two different approaches to compressing RGB and single-channel textures separately and together are described. In an "aggressive" approach, RGB textures are compressed in BC1 format while single-channel textures are compressed in BC4 format. In a conservative approach, separate models are generated for each kind of texture to encode and decode them more efficiently.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:

executing, by processing circuitry, a first neural network configured to output a set of predicted endpoints for a given block of uncompressed data, the given block comprising a plurality of data points;

executing, by the processing circuitry, a second neural network configured to output a predicted uncompressed value for each data point of the given block;

generating, by the processing circuitry, weight indices including at least one weight index for each data point of the given block, based at least in part on the set of predicted endpoints and the predicted uncompressed values; and storing, by the processing circuitry, the weight indices as compressed data for the given block.

2. The method as claimed in claim 1, wherein each predicted uncompressed value represents an uncompressed color value in a color space, and the method further comprising:

computing, by the processing circuitry for each data point, an arithmetic distance between a color palette value and an uncompressed color value within the color space; and generating, by the processing circuitry, the weight index for each data point based on a respective computed arithmetic distance.

3. The method as claimed in claim 1, wherein a weight index represents an interpolation weight for computing a final color value corresponding to a given data point, using the set of predicted endpoints of the given block.

4. The method as claimed in claim 1, wherein the first neural network is executed using a two-dimensional (2D) index of the given block encoded using a first multi-resolution feature grid.

5. The method as claimed in claim 4, wherein the first multi-resolution feature grid comprises a plurality of levels representing resolutions from 16×16 to 1024×1024.

6. The method as claimed in claim 1, wherein the second neural network is executed, for a given data point, using a 2D coordinate of the given data point encoded using a second multi-resolution feature grid.

7. The method as claimed in claim 6, wherein the second multi-resolution feature grid comprises a second plurality of levels representing resolutions from 16×16 to 2048×2048.

8. A system comprising:

compression circuitry configured to retrieve uncompressed data from a memory; and one or more compute units comprising circuitry configured to compress the uncompressed data, wherein to compress the uncompressed data, the one or more compute units are configured to:

execute a first neural network to output a set of predicted endpoints for a given block of the uncompressed data, the given block comprising a plurality of data points;

execute a second neural network to output a predicted uncompressed value corresponding to each data point of the given block;

generate weight indices including at least one weight index for each data point of the given block, based at least in part on the set of predicted endpoints and the predicted uncompressed values; and a memory controller comprising circuitry to store the weight indices as compressed data for the given block.

9. The system as claimed in claim 8, wherein each predicted uncompressed value represents an uncompressed color value in a color space, and wherein the one or more compute units are further configured to:

compute, for each data point, an arithmetic distance between a color palette value and an uncompressed color value within the color space; and generate the weight index for each data point on respective computed arithmetic distance.

10. The system as claimed in claim 8, wherein a weight index represents an interpolation weight for computing a final color value corresponding to a given data point using the set of predicted endpoints of the given block.

11. The system as claimed in claim 8, wherein the first neural network is executed using a two-dimensional (2D) index of the given block encoded using a first multi-resolution feature grid.

12. The system as claimed in claim 11, wherein the first multi-resolution feature grid comprises a first plurality of levels representing resolutions from 16×16 to 1024×1024.

13. The system as claimed in claim 8, wherein the second neural network is executed for a given data point, using a 2D coordinate of the given data point encoded using a second multi-resolution feature grid.

14. The system as claimed in claim 13, wherein the second multi-resolution feature grid comprises a second plurality of levels representing resolutions from 16×16 to 2048×2048.

15. A graphics rendering system comprising:

at least one memory storing one or more blocks of uncompressed data, each block of uncompressed data comprising a plurality of data points; and at least one processor configured to:

generate weight indices including at least one weight index for each data point of a given block, based at least in part on a set of predicted endpoints for the given block and a predicted uncompressed value for each data point; and store the generated weight indices as compressed data for the given block.

16. The graphics rendering system as claimed in claim 15, wherein the at least one processor is further configured to:

generate a color palette value for the given block based on the predicted set of endpoints, wherein the color palette value is indicative of a color space for the given block;

compute, for each data point in the color space, an arithmetic distance between the color palette value and a corresponding uncompressed value; and generate the weight index for each data point based on respective computed arithmetic distance.

17. The graphics rendering system as claimed in claim 15, wherein the uncompressed data is texture data and each data point is a texel.

18. The graphics rendering system as claimed in claim 17, wherein a first neural network is executed using a two-dimensional (2D) index of the given block encoded using a first multi-resolution feature grid that comprises a first plurality of levels representing resolutions from 16×16 to 1024×1024.

19. The graphics rendering system as claimed in claim 17, wherein a second neural network is executed for a given data point using a 2D coordinate of the given data point encoded using a second multi-resolution feature grid.

20. The graphics rendering system as claimed in claim 15, wherein the second multi-resolution feature grid comprises a second plurality of levels representing resolutions from 16×16 to 2048×2048.

* * * * *